(12) United States Patent
Taniguchi et al.

(10) Patent No.: US 7,527,685 B2
(45) Date of Patent: *May 5, 2009

(54) INK FOR INK-JET RECORDING

(75) Inventors: Akihiko Taniguchi, Nagoya (JP); Kazuma Goto, Nagoya (JP); Masaya Fujioka, Nagoya (JP); Shunichi Higashiyama, Yotsukaichi (JP)

(73) Assignee: Brother Kogyo Kabushiki Kaisha, Nagoya-Shi (JP)

(*) Notice: Subject to any disclaimer, the term of this patent is extended or adjusted under 35 U.S.C. 154(b) by 851 days.

This patent is subject to a terminal disclaimer.

(21) Appl. No.: 10/643,291

(22) Filed: Aug. 19, 2003

(65) Prior Publication Data

US 2004/0031419 A1    Feb. 19, 2004

(30) Foreign Application Priority Data

Aug. 19, 2002   (JP) ............................. 2002-238520

(51) Int. Cl.
    C09D 11/02    (2006.01)
(52) U.S. Cl. ................. 106/31.6; 106/31.89; 106/31.75
(58) Field of Classification Search ................ 106/31.6, 106/31.89, 31.75

See application file for complete search history.

(56) References Cited

U.S. PATENT DOCUMENTS

| | | | |
|---|---|---|---|
| 5,562,762 A | * | 10/1996 | Mrvos et al. ............. 106/31.43 |
| 6,695,898 B2 | * | 2/2004 | Momose ................... 106/31.43 |
| 6,695,900 B2 | * | 2/2004 | Momose ................... 106/31.75 |
| 2003/0032697 A1 | * | 2/2003 | Koga et al. .................... 523/160 |
| 2003/0174193 A1 | * | 9/2003 | Sago et al. .................... 347/100 |
| 2003/0177940 A1 | * | 9/2003 | Fujioka et al. ............. 106/31.6 |
| 2003/0179268 A1 | * | 9/2003 | Koga et al. .................... 347/100 |

FOREIGN PATENT DOCUMENTS

| | | |
|---|---|---|
| JP | 8143803 | 6/1996 |
| JP | 8-259864 | 10/1996 |
| JP | 8-283631 | 10/1996 |
| JP | 2003-268268 | 9/2003 |
| JP | 2002-285048 | 10/2003 |

* cited by examiner

Primary Examiner—Jerry Lorengo
Assistant Examiner—Veronica Faison Gee
(74) Attorney, Agent, or Firm—Reed Smith LLP

(57) ABSTRACT

An ink for ink-jet recording is provided, which makes it possible to obtain vivid recorded matters by satisfying both of the prevention of the feathering and the prevention of the bleeding even when the recording is performed on regular paper. The ink for ink-jet recording contains a self-dispersing type microparticulate coloring agent, a surfactant, and water. When the surface tension is plotted in the vertical axis, and the concentration of the surfactant is plotted in the horizontal axis, then the correlation between the surface tension and the concentration of the surfactant can be represented by a correlation curve which has one inflection point and which has two local maximum points of curvature on both sides of the inflection point one by one. Further, the ink for ink-jet recording contains the surfactant at a concentration which is higher than a concentration corresponding to the local maximum point of the curvature on the low concentration side.

8 Claims, 7 Drawing Sheets

INK FOR INK-JET RECORDING

BACKGROUND OF THE INVENTION

1. Field of the Invention

The present invention relates to an ink for ink-jet recording which makes it possible to obtain vivid recorded matters by satisfying both of the prevention of the feathering and the prevention of the bleeding even when the recording is performed on regular paper.

2. Description of the Related Art

In the ink-jet recording system, ink droplets are formed by means of the ink discharge method including, for example, the electrostatic attraction method, the method in which mechanical vibration or displacement is applied to the ink by using a piezoelectric element or the like, and the method in which bubbles are generated by heating the ink to utilize the pressure generated thereby. All or a part of the ink droplets are adhered to a recording objective material such as paper to perform the recording. Those usable as the ink for ink-jet recording to be used for the ink-jet recording system as described above include those which are obtained by dissolving or dispersing a variety of water-soluble dyes or pigments in water or a liquid medium composed of water and a water-soluble organic solvent.

In order to perform the satisfactory recording over a long period of time, for example, it is required for the ink for ink-jet recording as described above that characteristic values including, for example, the viscosity, the surface tension, and the density have appropriate values, that any deposit is not formed and/or physical values are not changed, for example, by the heat in order to avoid any clog-up at the nozzle and the orifice of the recording apparatus so that the ink is discharged in a stable manner, and that the recorded image is excellent, for example, in water resistance and weather resistance.

When the recording is performed with an ink-jet printer by using a general ink for ink-jet recording, any exclusive ink-jet paper is sometimes used in order to obtain a satisfactory printing quality without any blurring. However, in recent years, it is more demanded that the recording is performed on the regular paper rather than on the exclusive ink-jet paper, in consideration of the running cost and the environment. Further, in the market directed to homes and offices, it is overwhelmingly demanded that the recording is performed with the colors rather than with the black-and-white or monochrome. Therefore, the color ink-jet printer is dominantly used. It is demanded that the color recording can be performed with a good printing quality on the regular paper.

However, the printing quality on the regular paper is still insufficient. Major factors therefor may include the following two factors. One is the problem called "feathering". In this case, the ink is nonuniformly blurred along the surface of the recording paper when the ink is permeated into the recording paper. The edges of image portions are notched, and it is impossible to obtain any sharp edge of the image portion. The other is the problem called "bleeding". In this case, inks having different colors are mixed with each other at boundary portions between those having different colors. The both inks are blurred, and the printing quality is deteriorated.

In view of the above, many techniques have been hitherto used in order to avoid the feathering and the bleeding so that the printing quality is improved. A method, in which the surface tension is increased, is widely known as a general technique for avoiding the feathering. For example, Japanese Patent Application Laid-open No. 8-259864 discloses a technique in which the surface tension of an ink is made to be not less than 40 mN/m so that the blurring is suppressed and the feathering is avoided. However, in this method, the permeation of the ink into the paper is slow. Therefore, the bleeding tends to occur on the paper surface.

On the other hand, those widely used as a general technique for avoiding the bleeding include a method in which alkyl ether of polyvalent alcohol such as diethylene glycol monobutyl ether is blended as a permeating agent to an ink and/or a surfactant is blended. For example, Japanese Patent Application Laid-open No. 8-283631 discloses a technique in which a specified permeating agent and a surfactant are blended to an ink to lower the surface tension and enhance the permeability into the paper so that the bleeding is avoided. However, in this method, the feathering tends to occur.

As described above, the conventional inks for ink-jet recording have involved such a problem that it is difficult to satisfy both of the prevention of the feathering and the prevention of the bleeding on the regular paper.

SUMMARY OF THE INVENTION

The present invention has been made in order to solve the problem as described above, an object of which is to provide an ink for ink-jet recording which makes it possible to obtain vivid recorded matters by satisfying both of the prevention of the feathering and the prevention of the bleeding even when the recording is performed on regular paper. Another object of the invention is to provide an ink cartridge accommodating the ink of the invention.

According to the present invention, there is provided an ink for ink-jet recording comprising an anionic self-dispersing type coloring agent, a surfactant having both of a cationic moiety and a nonionic moiety, and water. In the ink of the present invention, a curve, which represents a change of surface tension of the ink with respect to a concentration of the surfactant, may have one inflection point, the curve may have a first local maximum point and a second local maximum point on a low concentration side and on a high concentration side of the inflection point respectively, and a concentration of the surfactant contained in the ink may be higher than a concentration corresponding to the first local maximum point. The cationic moiety may be N (nitrogen), and the nonionic moiety may be ethylene oxide. The surfactant may be an alkylamine ethylene oxide adduct represented by the general formula (1) as described later on.

According to a second aspect of the present invention, there is provided an ink cartridge which accommodates the ink for ink-jet recording of the present invention.

DESCRIPTION OF THE PREFERRED EMBODIMENTS

The ink for ink-jet recording of the present invention contains the self-dispersing type microparticulate coloring agent, especially the anionic self-dispersing type microparticulate coloring agent. The self-dispersing type microparticulate coloring agent has a functional group which gives the dispersibility to the surface of the pigment or the coloring resin microparticles. In general, the main component of the skeleton is composed of, for example, hydrophobic hydrocarbon. For example, —$SO_3$— group and —COO— group exist on parts of the surface. As for the self-dispersing type microparticulate coloring agent, the surfaces of the particles themselves are charged $\delta$−, and the particles are dispersed by themselves in accordance with the electric repulsion. In general, a dispersing agent such as a surfactant is used in order to stably disperse the pigment and the coloring resin particles in a solvent. Such a dispersing agent facilitates the action to permeate the ink into the paper, and it provides a factor to cause any nonuniform blurring. However, in the case of the ink for ink-jet recording of the present invention, it is unnecessary to contain any dispersing agent owing to the use of the self-dispersing type microparticulate coloring agent. Therefore, it is possible to avoid any nonuniform blurring. The action in the ink of the surfactant which is generally used as the dispersing agent is different from that of the surfactant which is used for the ink for ink-jet recording of the present invention. The self-dispersing type microparticulate coloring agent is not specifically limited. Those commercially available may include, for example, CABO-O-JET 200 and CABO-O-JET 300 (produced by Cabot).

Figure 1:
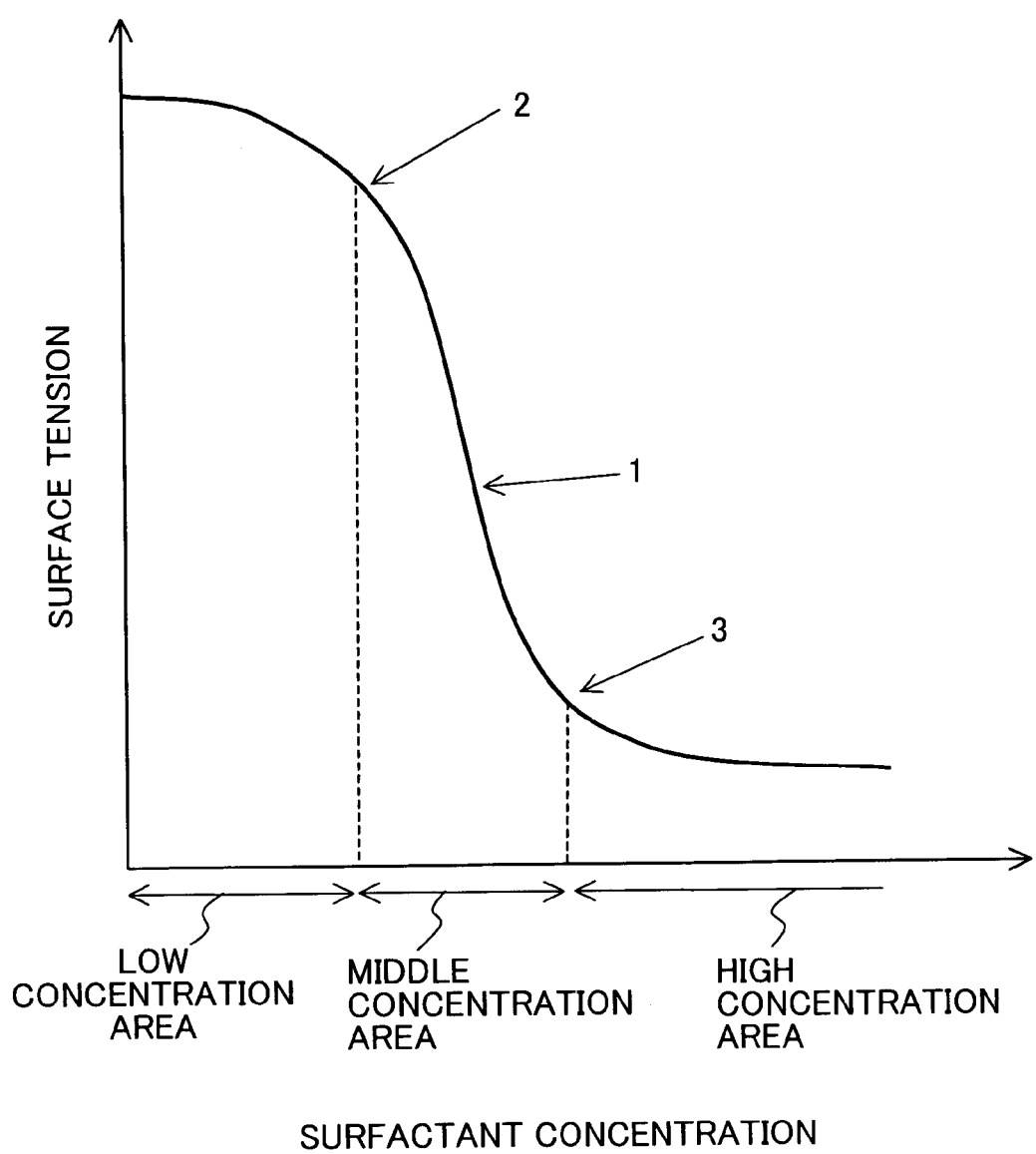
FIG. 1 schematically shows a correlation curve which represents the correlation between the surface tension and the concentration of the surfactant in the ink-jet recording ink of the present invention.

The ink for ink-jet recording of the present invention contains the surfactant which exhibits the strong interaction with the anionic self-dispersing type microparticulate coloring agent described above, rather than the surfactant which is generally used as the dispersing agent. Accordingly, when the surface tension is plotted in the vertical axis, and the concentration of the surfactant is plotted in the horizontal axis, then the correlation between the surface tension and the concentration of the surfactant can be represented by a correlation curve which has one inflection point and which has two local maximum points of curvature on both sides of the inflection point one by one. FIG. 1 shows an example of the correlation curve which has one inflection point and which has two local maximum points of curvature on both sides of the inflection point one by one. In FIG. 1, the inflection point is the point which is indicated by "1" on the correlation curve. The inflection point is the point at which the decrement rate of the surface tension, which is obtained by dividing the decrement amount of the surface tension by the increment amount of the concentration of the surfactant, exhibits the local maximum value. The inflection point is the point at which the slope of the correlation curve is maximized. The local maximum point of the curvature of the correlation curve is the point at which the curvature of the correlation curve is maximized. In FIG. 1, there are the first local maximum point which is indicated by "2" on the correlation curve and which corresponds to the concentration lower than the concentration corresponding to the inflection point, and the second local maximum point which is indicated by "3" on the correlation curve and which corresponds to the concentration higher than the concentration corresponding to the inflection point. The correlation curve indicates the correlation between the surface tension and the concentration of the surfactant in the ink for ink-jet recording of the present invention. The correlation curve can be divided into three areas by the first local maximum point and the second local maximum point. That is, the area, in which the concentration of the surfactant is lower than the concentration corresponding to the first local maximum point, is designated as "low concentration area". The area, in which the concentration of the surfactant is higher than the concentration corresponding to the first local maximum point and lower than the concentration corresponding to the second local maximum point, is designated as "middle concentration area". The area, in which the concentration of the surfactant is higher than the concentration corresponding to the second local maximum point, is designated as "high concentration area". On this assumption, the ink for ink-jet recording of the present invention behaves as follows. That is, the decrement rate of the surface tension is small in the low concentration area, the decrement rate of the surface tension is large in the middle concentration area, and the decrement rate of the surface tension is small in the high concentration area.

When the surfactant and the self-dispersing type microparticulate coloring agent are simultaneously contained in the ink, then the surfactant is charged $\delta$+, and the self-dispersing type microparticulate coloring agent is charged $\delta$−. Accordingly, the surfactant exhibits the strong interaction with the self-dispersing type microparticulate coloring agent as compared with the surfactant which is generally used as the dispersing agent. The force to approach the self-dispersing type microparticulate coloring agent by the aid of the electric attracting force is exerted on the surfactant to a greater extent as compared with the force to move to the surface of the ink liquid which is the interface with respect to the air. As for the surfactant which has approached the self-dispersing type microparticulate coloring agent, the hydrophobic group is directed toward the self-dispersing type microparticulate coloring agent which is hydrophobic, and the hydrophilic group (nonionic moiety) is directed toward the liquid phase. Therefore, the self-dispersing type microparticulate coloring agent is in a state of being coated with the hydrophilic groups. As a result, the self-dispersing type microparticulate coloring agent is prevented from aggregation and sedimentation in the ink. The self-dispersing type microparticulate coloring agent exhibits the strong interaction with the surfactant. Therefore, the self-dispersing type microparticulate coloring agent is deposited or adhered to the paper in the state of being coated with the hydrophilic groups, and the hydrophilic groups twine around the hydrophilic cellulose which is the main component of the paper. Accordingly, the ink is hardly moved on the paper surface, and it is possible to reduce the nonuniform blurring which would be otherwise caused by the feathering and the bleeding. That is, the surfactant described above has the characteristics as shown in FIG. 1 in the ink in which the anionic self-dispersing type microparticulate coloring agent is contained. Further, when the surfactant is contained at the concentration higher than the concentration corresponding to the first local maximum point, the feathering and the bleeding of the ink are reduced.

In the low concentration area, the surfactant has such a property that the surfactant tends to coat the surface of the microparticulate coloring agent rather than the surfactant moves to the surface of the ink liquid. Therefore, the increment amount of the surfactant is small on the surface of the ink liquid with respect to the increase of the concentration of the surfactant. The decrement rate of the surface tension is decreased. In the middle concentration area, the microparticulate coloring agent has been thoroughly coated with the surfactant. When the concentration of the surfactant is further increased, then the surfactant is moved to the ink liquid surface, the surface tension is suddenly decreased, and the decrement rate of the surface tension is increased. In the high concentration area, the ink liquid surface is thoroughly coated with the surfactant, and the surface tension is stabilized. Therefore, the decrement rate of the surface tension is decreased again with respect to the increase of the concentration of the surfactant.

The surfactant, which is provided with both of the cationic moiety and the nonionic moiety, is used as the surfactant which gives the property as described above to the ink for ink-jet recording of the present invention in order to bring about the interaction between the surfactant and the anionic self-dispersing type microparticulate coloring agent. As described above, the cationic moiety is adhered to the anionic self-dispersing type microparticulate coloring agent, and the nonionic moiety prevents the self-dispersing type microparticulate coloring agent from aggregation and sedimentation. The cationic moiety may be N, and the nonionic moiety may be ethylene oxide. More specifically, for example, an alkylamine ethylene oxide adduct represented by the following general formula (1) is preferably usable.

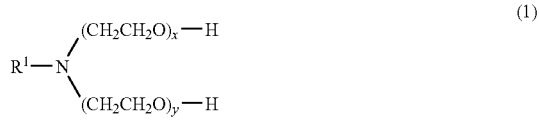

(1)

$R^1$ represents alkyl group having a number of carbon atoms of 8 to 18, and x and y represent integers which satisfy x+y=5 to 15.

In the alkylamine ethylene oxide adduct, two hydrophilic ethylene oxide groups and one hydrophobic alkyl group are bonded to a nitrogen atom. When the alkylamine ethylene oxide adduct is dissolved in water, then it serves as an organic base, and it is charged δ+ as a result of addition of proton. The alkylamine ethylene oxide adduct tends to twine around the hydrophilic cellulose which is the main component of the paper, because the hydrophilic ethylene oxide group is long. Accordingly, it is possible to effectively reduce the nonuniform blurring caused by the feathering on the paper surface. Those commercially available may include, for example, ETHOMEEN™ C/15, ETHOMEEN™ S/25, ETHOMEEN™ S/15, and ETHOMEEN™ S/25 (produced by Lion Corporation); and NYMEEN™ L-202 ($R^1$=$C_{12}H_{25}$) and NYMEEN™ S-204 ($R^1$=$C_{18}H_{37}$) (produced by NOF Corporation).

Alternatively, ETHOPROPOMEN™ C/18-18 which is represented by the general formula (2) and which is available from Lion Corporation may be used as the surfactant provided with both of the cationic moiety and the nonionic moiety.

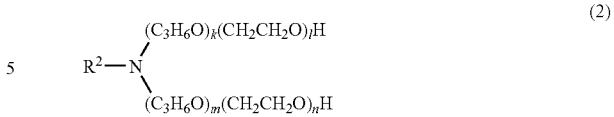

(2)

$R^2$ represents alkyl group having a number of carbon atom or carbon atoms of 1 to 18, and k, l, m and n represent integers which satisfy k+l+m+n=16.

The ink for ink-jet recording of the present invention contains the surfactant at the concentration which is higher than the concentration corresponding to the first local maximum point. Owing to the surfactant contained at the concentration higher than the concentration corresponding to the first local maximum point, the microparticulate coloring agent, which is contained in the ink for ink-jet recording of the present invention, is thoroughly coated with the surfactant. Even when the recording is performed on the regular paper, the microparticulate coloring agent hardly moves on the paper surface. Therefore, the line edge is sharp, and the bleeding is scarcely caused. Preferably, the surfactant is contained at a concentration higher than the concentration corresponding to the second local maximum point. When the surfactant is contained at the concentration higher than the concentration corresponding to the second local maximum point, the speed of permeation of the ink solvent into the paper is fast, because the surface tension of the ink is sufficiently lowered. The period of time, in which the liquid inks make contact with each other at the boundary portion between those having different colors on the paper surface, is further shortened. Therefore, the bleeding can be further reduced while maintaining the sharp line edge. Thus, it is possible to satisfy both of the prevention of the feathering and the prevention of the bleeding. The preferred upper limit of the blending amount of the surfactant is 3% by weight with respect to the total amount of the ink for ink-jet recording of the present invention. If the blending amount exceeds 3% by weight, problems concerning, for example, deposition and drying-up are caused in some cases when the amount of water in the ink is decreased due to the evaporation or the like. When the surfactant is ETHOMEEN™ C/15, ETHOMEEN™ C/15 is preferably contained by not less than 0.25% by weight and especially preferably not less than 0.4% by weight. When the surfactant is ETHOMEEN™ S/25, ETHOMEEN™ S/25 is preferably contained by not less than 0.15% by weight and especially preferably not less than 0.3% by weight.

The ink for ink-jet recording of the present invention contains water. The water is preferably deionized water (pure water). The blending amount of the water is preferably not less than 40% by weight with respect to the total amount of the ink for ink-jet recording of the present invention. If the blending amount is less than 40% by weight, it is sometimes impossible to maintain the viscosity of the ink in the normal state to be a low viscosity at which the jetting operation can be normally performed.

It is preferable that the ink for ink-jet recording of the present invention further contains a water-soluble organic solvent in order to prevent the ink from any drying-up at the tip of the recording head. The water-soluble organic solvent is not specifically limited. There may be exemplified, for example, polyalkylene glycols such as polyethylene glycol; alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol, and hexylene glycol;

glycerol; and pyrrolidones such as 2-pyrrolidone and N-methyl-2-pyrrolidone. The water-soluble organic solvent may be used singly. Alternatively, two or more of the water-soluble organic solvents may be used in combination.

The blending amount of the water-soluble organic solvent is preferably 5 to 40% by weight with respect to the total amount of the ink for ink-jet recording of the present invention. If the blending amount is less than 5% by weight, the moistening function is insufficient. When the amount of water is decreased due to the evaporation or the like, problems concerning, for example, deposition and drying-up are caused in some cases. If the blending amount exceeds 40% by weight, the viscosity of the ink is unnecessarily increased. Problems are caused in some cases, for example, such that the jetting operation cannot be performed, and the ink is dried on the recording paper extremely slowly. The blending amount is more preferably 7 to 40% by weight and much more preferably 10 to 30% by weight.

The ink for ink-jet recording of the present invention is basically constructed as described above. However, if necessary, the ink for ink-jet recording of the present invention may contain, for example, permeating agents, viscosity-adjusting agents, surface tension-adjusting agents, pH-adjusting agents, and antiseptic/fungicidal agents.

During the ink-jet recording, the ink for ink-jet recording of the present invention is landed on the paper in the state in which the self-dispersing type microparticulate coloring agent contained in the ink is coated with the hydrophilic group of the surfactant. The hydrophilic group of the surfactant, which coats the self-dispersing type microparticulate coloring agent, twines around the hydrophilic cellulose which is the main component of the paper. Accordingly, even when the recording is performed on the regular paper, it is possible to bring about vivid recorded matters by satisfying both of the prevention of the feathering and the prevention of the bleeding. In particular, when the concentration of the surfactant is high, the ink solvent is quickly permeated into the paper. Therefore, it is possible to avoid the bleeding more effectively.

EXAMPLES

The present invention will be explained in more detail below as exemplified by Examples. However, the present invention is not limited to only Examples.

Example 1

Figure 2:
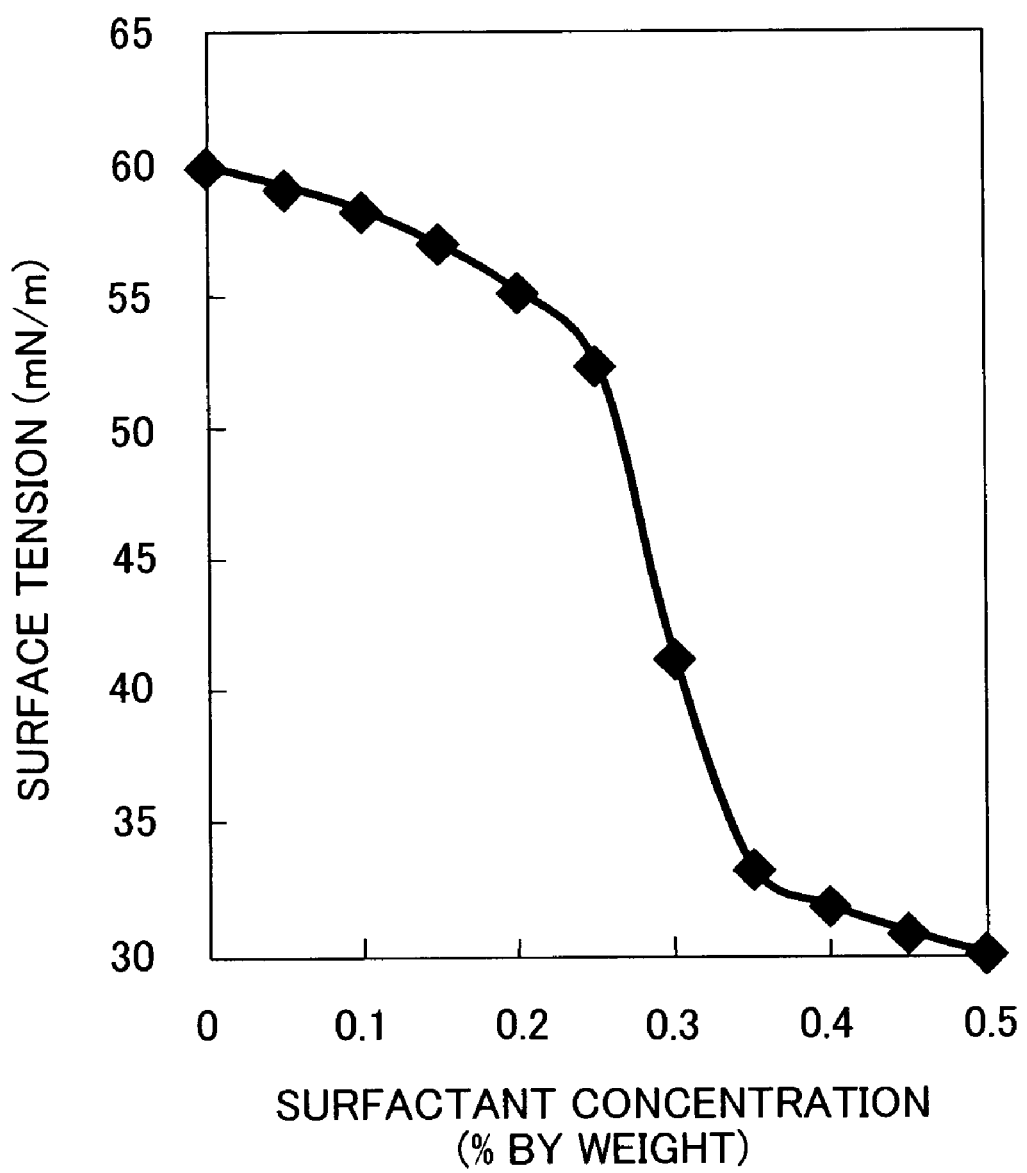
FIG. 2 shows a correlation curve determined by measuring the surface tensions of ink-jet recording inks while changing the concentrations of the surfactant and water for the ink-jet recording inks composed of the same materials as those of ink-jet recording inks 1, 2, and 5.

CABO-O-JET 300 as a self-dispersing type microparticulate coloring agent was used as the coloring agent, and ETHOMEEN™ C/15 as an alkylamine ethylene oxide adduct represented by the general formula (1) was used as the surfactant. The following materials were sufficiently agitated and mixed with each other, followed by being filtrated through a membrane filter of 2.5 μm to prepare an ink for ink-jet recording (ink-jet recording ink) 1 having the following composition. As for the ink-jet recording ink 1, the concentration of the surfactant was higher than a concentration corresponding to a first local maximum point shown in FIG. 2 as described later on, and the surface tension was 52.3 mN/M. The Wilhelmy method was used for the surface tension, in which the force, which was required when the ink was poured into a petri dish, a platinum plate was immersed therein, and the platinum plate was pulled up therefrom, was measured. Type CBVP-Z produced by Kyowa Interface Science Co., Ltd. was used as a surface tension meter.

Ink-Jet Recording Ink 1
CABO-O-JET 300 (produced by Cabot, carbon black dispersion, pigment concentration: 15% by weight, balance: pure water): 33.3% by weight;
Glycerol: 25% by weight;
Diethylene glycol diethyl ether: 0.5% by weight;
ETHOMEEN™ C/15 (produced by Lion Corporation, surfactant based on alkylamine ethylene oxide adduct): 0.25% by weight;
Pure water: 40.95% by weight.

Example 2

CABO-O-JET 300 as a self-dispersing type microparticulate coloring agent was used as the coloring agent, and ETHOMEEN™ C/15 as an alkylamine ethylene oxide adduct represented by the general formula (1) was used as the surfactant. The following materials were sufficiently agitated and mixed with each other, followed by being filtrated through a membrane filter of 2.5 μm to prepare an ink-jet recording ink 2 having the following composition. As for the ink-jet recording ink 2, the concentration of the surfactant was higher than a concentration corresponding to a second local maximum point shown in FIG. 2 as described later on, and the surface tension was 31.9 mN/m.

Ink-Jet Recording Ink 2
CABO-O-JET 300 (produced by Cabot, carbon black dispersion, pigment concentration: 15% by weight, balance: pure water): 33.3% by weight;
Glycerol: 25% by weight;
Diethylene glycol diethyl ether: 0.5% by weight;
ETHOMEEN™ C/15 (produced by Lion Corporation, surfactant based on alkylamine ethylene oxide adduct): 0.4% by weight;
Pure water: 40.8% by weight.

Example 3

Figure 3:
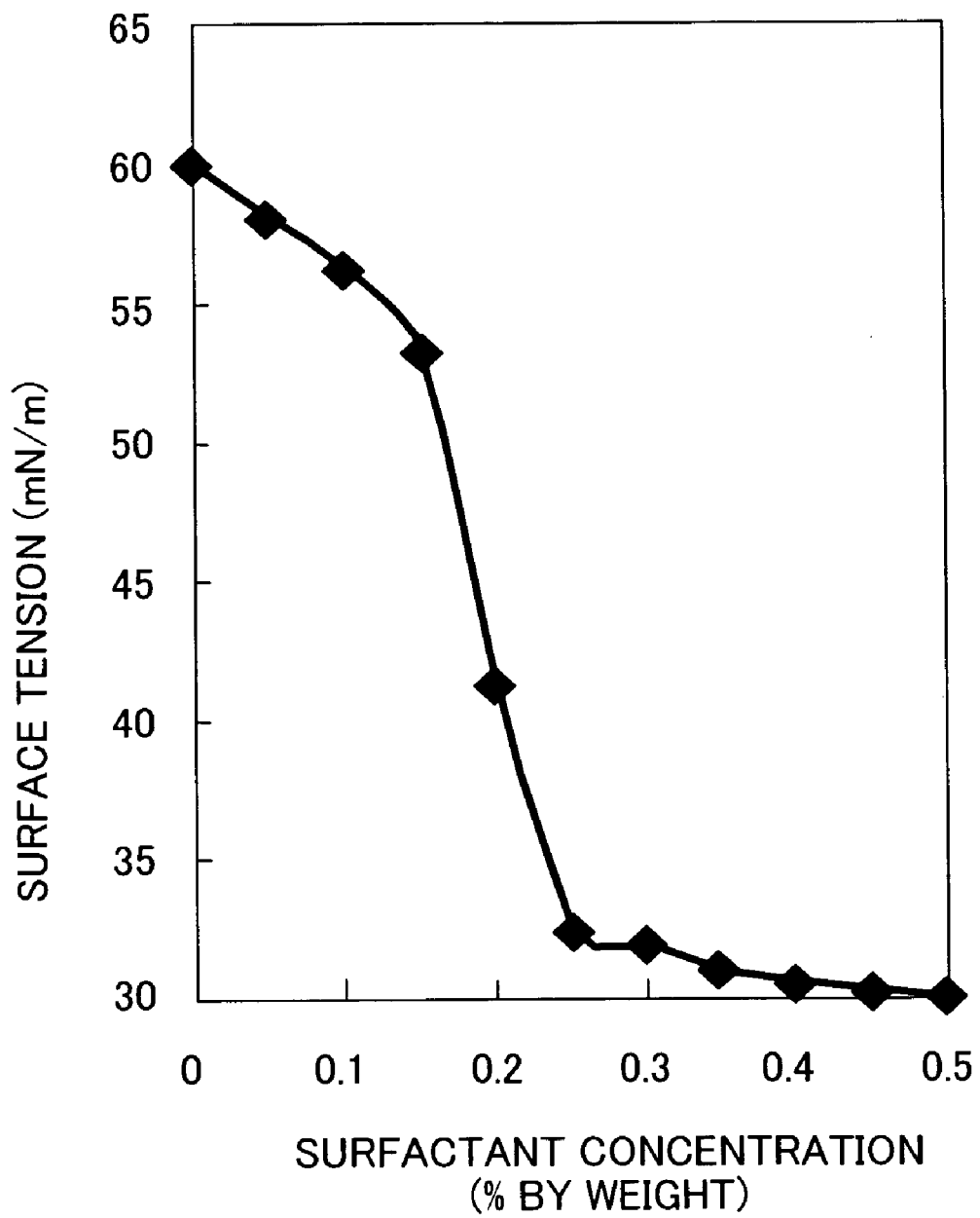
FIG. 3 shows a correlation curve determined by measuring the surface tensions of ink-jet recording inks while changing the concentrations of the surfactant and water for the ink-jet recording inks composed of the same materials as those of ink-jet recording inks 3 and 4.

CABO-O-JET 200 as a self-dispersing type microparticulate coloring agent was used as the coloring agent, and ETHOMEEN™ S/25 as an alkylamine ethylene oxide adduct represented by the general formula (1) was used as the surfactant. The following materials were sufficiently agitated and mixed with each other, followed by being filtrated through a membrane filter of 2.5 μm to prepare an ink-jet recording ink 3 having the following composition. As for the ink-jet recording ink 3, the concentration of the surfactant was higher than a concentration corresponding to a first local maximum point shown in FIG. 3 as described later on, and the surface tension was 53.2 mN/M.

Ink-Jet Recording Ink 3
CABO-O-JET 200 (produced by Cabot, carbon black dispersion, pigment concentration: 20% by weight, balance: pure water): 25% by weight;
Glycerol: 25% by weight;
Triethylene glycol monobutyl ether: 0.5% by weight;
ETHOMEEN™ S/25 (produced by Lion Corporation, surfactant based on alkylamine ethylene oxide adduct): 0.15% by weight;
Pure water: 49.35% by weight.

Example 4

CABO-O-JET 200 as a self-dispersing type microparticulate coloring agent was used as the coloring agent, and ETHOMEEN™ S/25 as a surfactant represented by the general formula (1) was used as the surfactant. The following materials were sufficiently agitated and mixed with each other, followed by being filtrated through a membrane filter of 2.5 μm to prepare an ink-jet recording ink 4 having the following composition. As for the ink-jet recording ink 4, the concentration of the surfactant was in a high concentration area shown in FIG. 3 as described later on, and the surface tension was 31.8 mN/m.

Ink-Jet Recording Ink 4

CABO-O-JET 200 (produced by Cabot, carbon black dispersion, pigment concentration: 15% by weight, balance: pure water): 25% by weight;
Glycerol: 25% by weight;
Triethylene glycol monobutyl ether: 0.5% by weight;
ETHOMEEN™ S/25 (produced by Lion Corporation, surfactant based on alkylamine ethylene oxide adduct): 0.3% by weight;
Pure water: 49.2% by weight.

Comparative Example 1

CABO-O-JET 300 as a self-dispersing type microparticulate coloring agent was used as the coloring agent, and ETHOMEEN™ C/15 as an alkylamine ethylene oxide adduct represented by the general formula (1) was used as the surfactant. The following materials were sufficiently agitated and mixed with each other, followed by being filtrated through a membrane filter of 2.5 μm to prepare an ink-jet recording ink 5 having the following composition. As for the ink-jet recording ink 5, the concentration of the surfactant was in a low concentration area shown in FIG. 2 as described later on, and the surface tension was 58.2 mN/m.

Ink-Jet Recording Ink 5

CABO-O-JET 300 (produced by Cabot, carbon black dispersion, pigment concentration: 15% by weight, balance: pure water): 33.3% by weight;
Glycerol: 25% by weight;
Diethylene glycol diethyl ether: 0.5% by weight;
ETHOMEEN™ C/15 (produced by Lion Corporation, surfactant based on alkylamine ethylene oxide adduct): 0.1% by weight;
Pure water: 41.1% by weight.

Comparative Example 2

Figure 4:
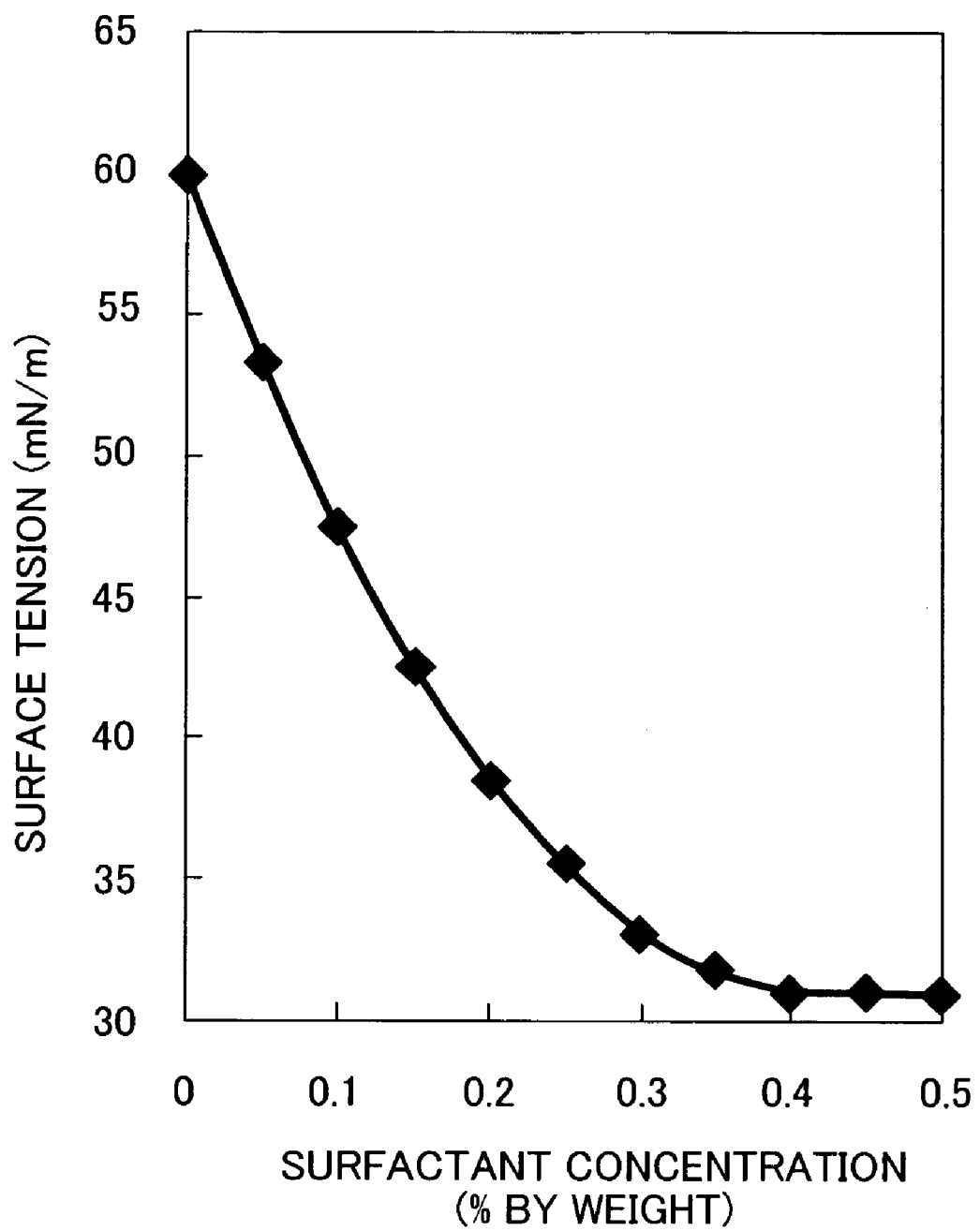
FIG. 4 shows a correlation curve determined by measuring the surface tensions of ink-jet recording inks while changing the concentrations of the surfactant and water for the ink-jet recording inks composed of the same materials as those of ink-jet recording inks 6 and 7.

CABO-O-JET 300 as a self-dispersing type microparticulate coloring agent was used as the coloring agent, and Sannonic DO-90 as a polyoxyethylene alkyl ether represented by the general formula (3) was used as the surfactant. The following materials were sufficiently agitated and mixed with each other, followed by being filtrated through a membrane filter of 2.5 μm to prepare an ink-jet recording ink 6 having the following composition. The ink-jet recording ink 6 did not have the three concentration areas corresponding to the concentrations of the surfactant as shown in FIG. 4 as described later on, and the surface tension was 31.0 mN/m.

$$R^2-O-(CH_2CH_2O)_9-H \quad (3)$$

$R^2$ represents an alkyl group having a number of carbon atoms of 12 to 14.

Ink-Jet Recording Ink 6

CABO-O-JET 300 (produced by Cabot, carbon black dispersion, pigment concentration: 15% by weight, balance: pure water): 33.3% by weight;
Glycerol: 25% by weight;
Diethylene glycol diethyl ether: 0.5% by weight;
Sannonic DO-90 (produced by Sanyo Chemical Industries, Ltd.): 0.4% by weight;
Pure water: 40.8% by weight.

Comparative Example 3

CABO-O-JET 300 as a self-dispersing type microparticulate coloring agent was used as the coloring agent, and Sannonic DO-90 as a polyoxyethylene alkyl ether represented by the general formula (2) was used as the surfactant. The following materials were sufficiently agitated and mixed with each other, followed by being filtrated through a membrane filter of 2.5 μm to prepare an ink-jet recording ink 7 having the following composition. The ink-jet recording ink 7 did not have the three concentration areas corresponding to the concentrations of the surfactant as shown in FIG. 4 as described later on, and the surface tension was 47.5 mN/m.

Ink-Jet Recording Ink 7

CABO-O-JET 300 (produced by Cabot, carbon black dispersion, pigment concentration: 15% by weight, balance: pure water): 33.3% by weight;
Glycerol: 25% by weight;
Diethylene glycol diethyl ether: 0.5% by weight;
Sannonic DO-90 (produced by Sanyo Chemical Industries, Ltd.): 0.1% by weight;
Pure water: 41.1% by weight.

Comparative Example 4

Figure 5:
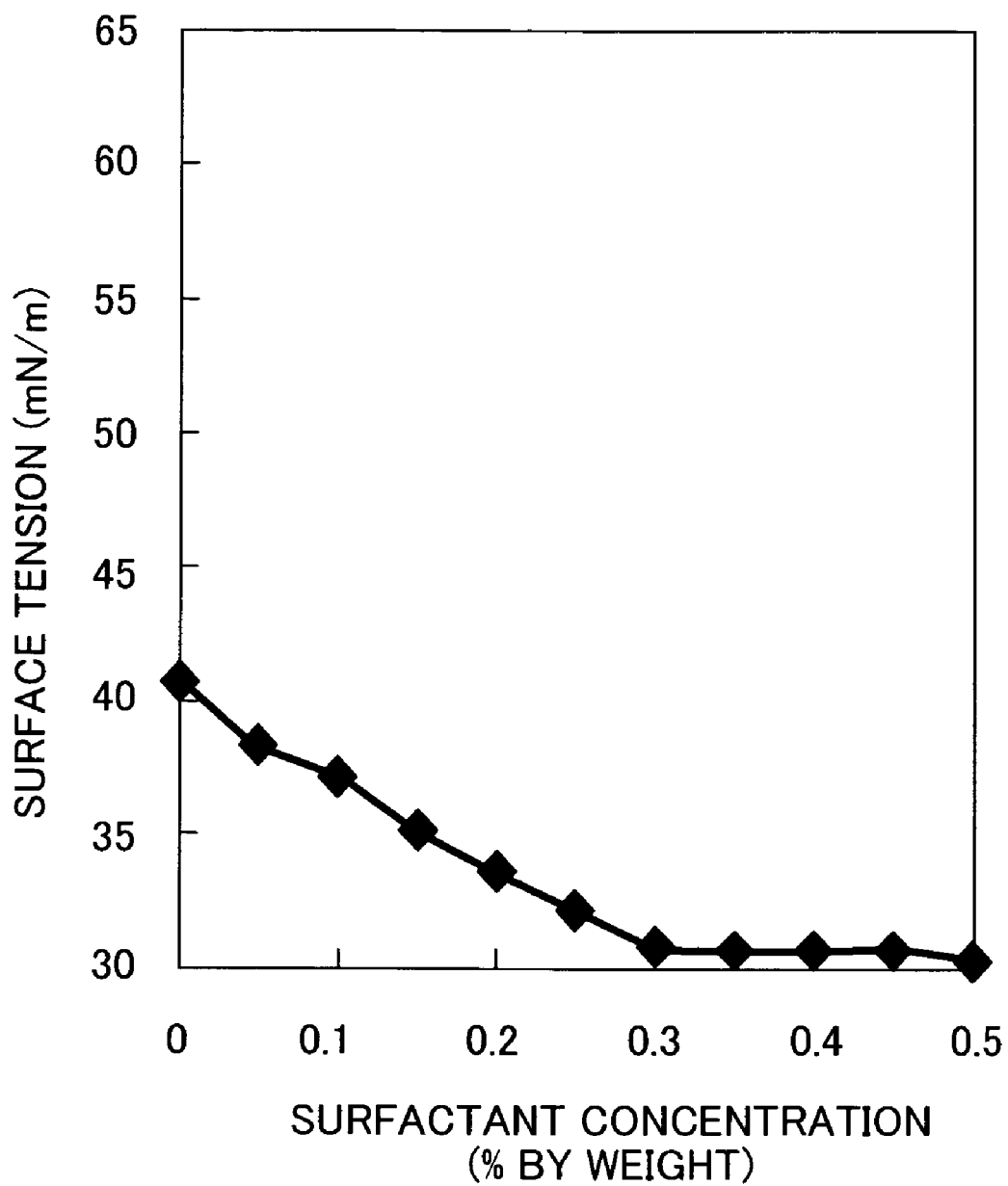
FIG. 5 shows a correlation curve determined by measuring the surface tensions of ink-jet recording inks while changing the concentrations of the surfactant and water for the ink-jet recording inks composed of the same materials as those of an ink-jet recording ink 8.

Carbon black MA-7 as a microparticulate coloring agent was used as the coloring agent, and ETHOMEEN™ C/15 as an alkylamine ethylene oxide adduct represented by the general formula (1) was used as the surfactant. It is noted that styrene-maleic anhydride copolymer is a water-soluble polymer which is generally used as a dispersing agent for the pigment. A mixture liquid composed of the following materials was subjected to a dispersing treatment with Pearl Mill (trade name, produced by Ashizawa) by using zirconia beads having 0.3 mm diameter as a pulverization media, and then the mixture was applied to a centrifugal separator to remove coarse particles, followed by being filtrated through a membrane filter of 2.5 μm to prepare an ink-jet recording ink 8 having the following composition. The ink-jet recording ink 8 did not have the three concentration areas corresponding to the concentrations of the surfactant as shown in FIG. 5 as described later on, and the surface tension was 30.6 mN/m.

Ink-Jet Recording Ink 8

Carbon black MA-7 (produced by Mitsubishi Chemical Corporation): 5% by weight;
Styrene-maleic anhydride copolymer (molecular weight: 10,000, acid value: 175): 3% by weight;
Glycerol: 20% by weight;
Diethylene glycol diethyl ether: 0.5% by weight;
ETHOMEEN™ C/15 (produced by Lion Corporation, surfactant based on alkylamine ethylene oxide adduct): 0.35% by weight;
Pure water: 71.15% by weight.

Comparative Example 5

Figure 6:
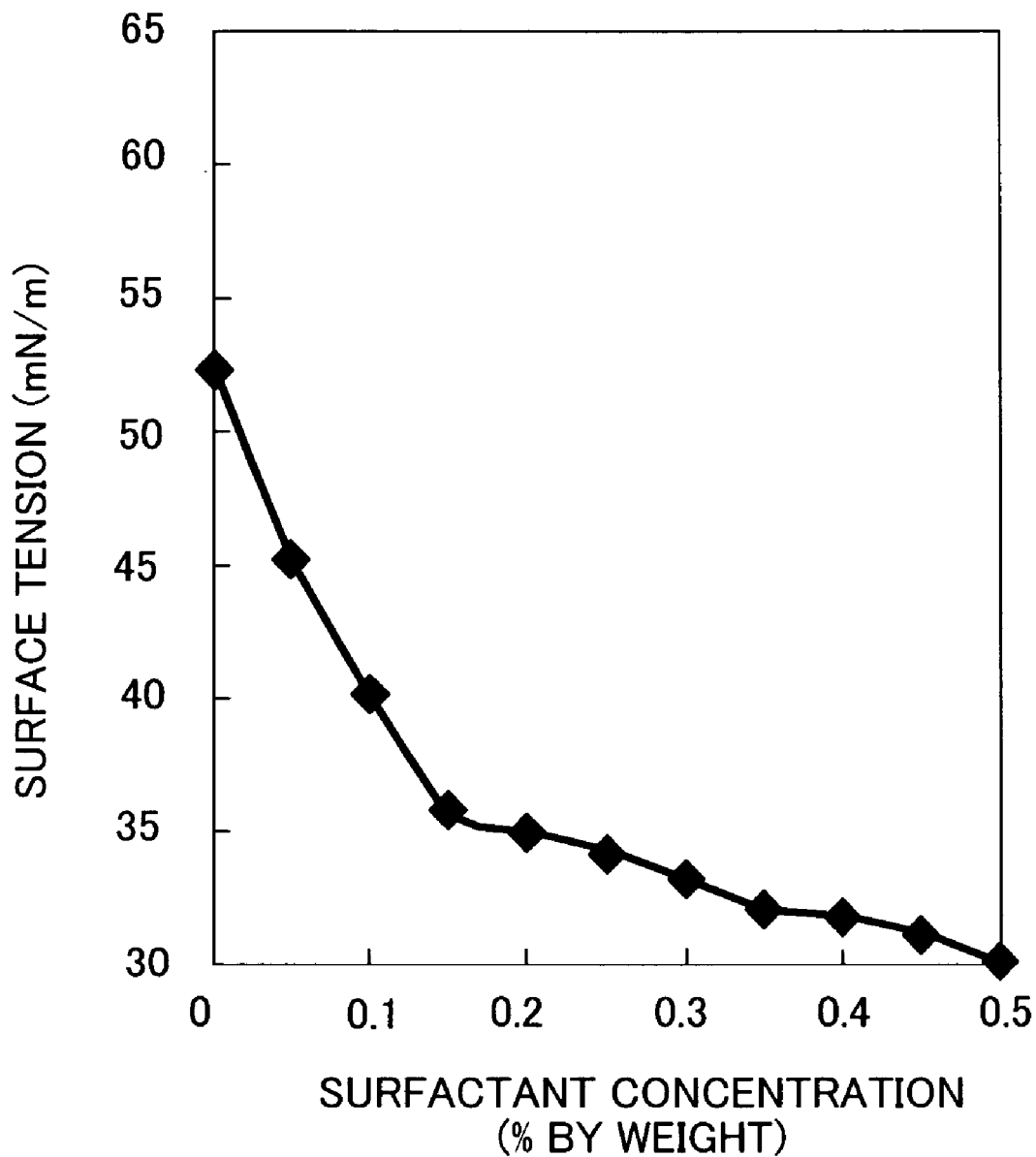
FIG. 6 shows a correlation curve determined by measuring the surface tensions of ink-jet recording inks while changing the concentrations of the surfactant and water for the ink-jet recording inks composed of the same materials as those of an ink-jet recording ink 9.

Color Index No. Direct Black 168 was used as the coloring agent without using any microparticulate coloring agent, and ETHOMEEN™ S/25 represented by the general formula (1) was used as the surfactant. The following materials were sufficiently agitated and mixed with each other, followed by being filtrated through a membrane filter of 2.5 μm to prepare an ink-jet recording ink 9 having the following composition. The ink-jet recording ink 9 did not have the three concentration areas corresponding to the concentrations of the surfactant as shown in FIG. 6 as described later on, and the surface tension was 35.0 mN/m.

Ink-Jet Recording Ink 9

Color Index No. Direct Black 168 (black dye): 5% by weight;
Glycerol: 25% by weight;
Triethylene glycol monobutyl ether: 4.0% by weight;
ETHOMEEN™ S/25 (produced by Lion Corporation, surfactant based on alkylamine ethylene oxide adduct): 0.2% by weight;
Pure water: 65.8% by weight.

Ink-jet recording inks composed of the same materials as those of the ink-jet recording inks 1, 2, 5, ink-jet recording inks composed of the same materials as those of the ink-jet recording inks 3, 4, ink-jet recording inks composed of the same materials as those of the ink-jet recording inks 6, 7, ink-jet recording inks composed of the same materials as those of the ink-jet recording ink 8, and ink-jet recording inks composed of the same materials as those of the ink-jet recording ink 9 were prepared. Correlation curves were determined for the respective inks by measuring the surface tensions of the ink-jet recording inks while changing the concentrations of the surfactant and water. The correlation curves are shown in FIGS. 2 to 6 in which the surface tension of the ink-jet recording ink is plotted in the vertical axis, and the concentration of the surfactant is plotted in the horizontal axis. Values are shown in Table 1.

TABLE 1

| Concentration of surfactant (% by weight) | | 0 | 0.05 | 0.1 | 0.15 | 0.2 | 0.25 |
|---|---|---|---|---|---|---|---|
| Surface tension (mN/m) | Inks 1, 2, 5 | 59.9 | 59.0 | 58.2 | 57.0 | 55.1 | 52.3 |
| | Inks 3, 4 | 59.9 | 58.0 | 56.2 | 53.2 | 41.3 | 32.3 |
| | Inks 6, 7 | 59.9 | 53.3 | 47.5 | 42.5 | 38.5 | 35.6 |
| | Ink 8 | 40.7 | 38.3 | 37.1 | 35.1 | 33.6 | 32.1 |
| | Ink 9 | 52.3 | 45.2 | 40.2 | 35.8 | 35.0 | 34.2 |
| Concentration of surfactant (% by weight) | | 0.3 | 0.35 | 0.4 | 0.45 | 0.5 | |
| Surface tension (mN/m) | Inks 1, 2, 5 | 41.2 | 33.2 | 31.9 | 30.8 | 30.0 | |
| | Inks 3, 4 | 31.8 | 31.0 | 30.5 | 30.2 | 30.0 | |
| | Inks 6, 7 | 33.0 | 31.8 | 31.0 | 31.0 | 30.9 | |
| | Ink 8 | 30.8 | 30.6 | 30.6 | 30.6 | 30.3 | |
| | Ink 9 | 33.2 | 32.1 | 31.8 | 31.2 | 30.2 | |

Evaluation

The following evaluations were performed with Xerox 4200 paper (produced by Xerox) as the recording paper by using a recording apparatus having an on-demand type multi-head (jetting nozzle diameter: 40 Am, driving voltage: 30 V, frequency: 10 kHz) for performing the recording by generating liquid droplets by applying the pressure brought about by the vibration of the piezoelectric element to the ink contained in the recording head, for the ink-jet recording inks 1 to 9 manufactured in Examples 1 to 4 and Comparative Examples 1 to 5.

(1) Evaluation of Feathering

Printing was performed to print those including letters and ruled lines with a single color with no background. Portions of letters and ruled lines were observed visually to perform the evaluation on the basis of the following criteria.

Evaluation Criteria for Feathering

++: feathering was scarcely observed, and letters were vivid.

+: feathering slightly occurred, but letters were sufficiently readable.

±: feathering clearly occurred, but letters were readable.

−: letters were hardly readable due to occurrence of feathering.

(2) Evaluation of Bleeding

Printing was performed to print those including letters and ruled lines in superimposition on a background color formed by a yellow ink having the following composition. Blurring was observed visually at boundary portions between the background color and the color of letters and ruled lines to perform the evaluation on the basis of the following criteria.

Yellow Ink

Direct Yellow 132: 5% by weight;
Glycerol: 20% by weight;
Diethylene glycol: 5% by weight;
Triethylene glycol monobutyl ether: 1.5% by weight;
Pure water: 68.5% by weight.

Evaluation Criteria for Bleeding

++: bleeding was scarcely observed, and approximately equivalent vividness of letters was obtained as compared with the case of no background.

+: bleeding slightly occurred, but letters were sufficiently readable.

±: bleeding clearly occurred, but letters were readable.

−: letters were hardly readable due to occurrence of bleeding.

Results of the evaluations are summarized and shown in Table 2 for the ink-jet recording inks 1 to 9 manufactured in Examples 1 to 4 and Comparative Examples 1 to 5.

TABLE 2

| | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|
| Feathering | ++ | ++ | ++ | ++ | ± | − | ± | − | − |
| bleeding | + | ++ | + | ++ | ± | − | − | − | − |

As shown in Table 2, when the recording was performed by using the ink-jet recording inks manufactured in Examples 1 to 4, then both of the prevention of the feathering and the prevention of the bleeding were satisfied, and recorded matters, which were sharp and vivid and which had excellent printing qualities, were successfully obtained. In particular, when the recording was performed by using the ink-jet recording inks manufactured in Examples 2 and 4, the bleeding was successfully avoided especially effectively, because the surface tension of the ink was sufficiently low, and the permeation speed of the ink solvent into the paper was sufficiently fast. On the other hand, when the recording was performed by using the ink-jet recording inks manufactured in Comparative Examples 1 to 5, then the nonuniform blurring was observed due to the feathering in some cases, and/or the boundary portion between the different colors was indistinct in other cases. Therefore, the ink-jet recording inks manufactured in Comparative Examples 1 to 5 involved problems concerning the prevention of the feathering and/or the prevention of the bleeding.

Figure 7:
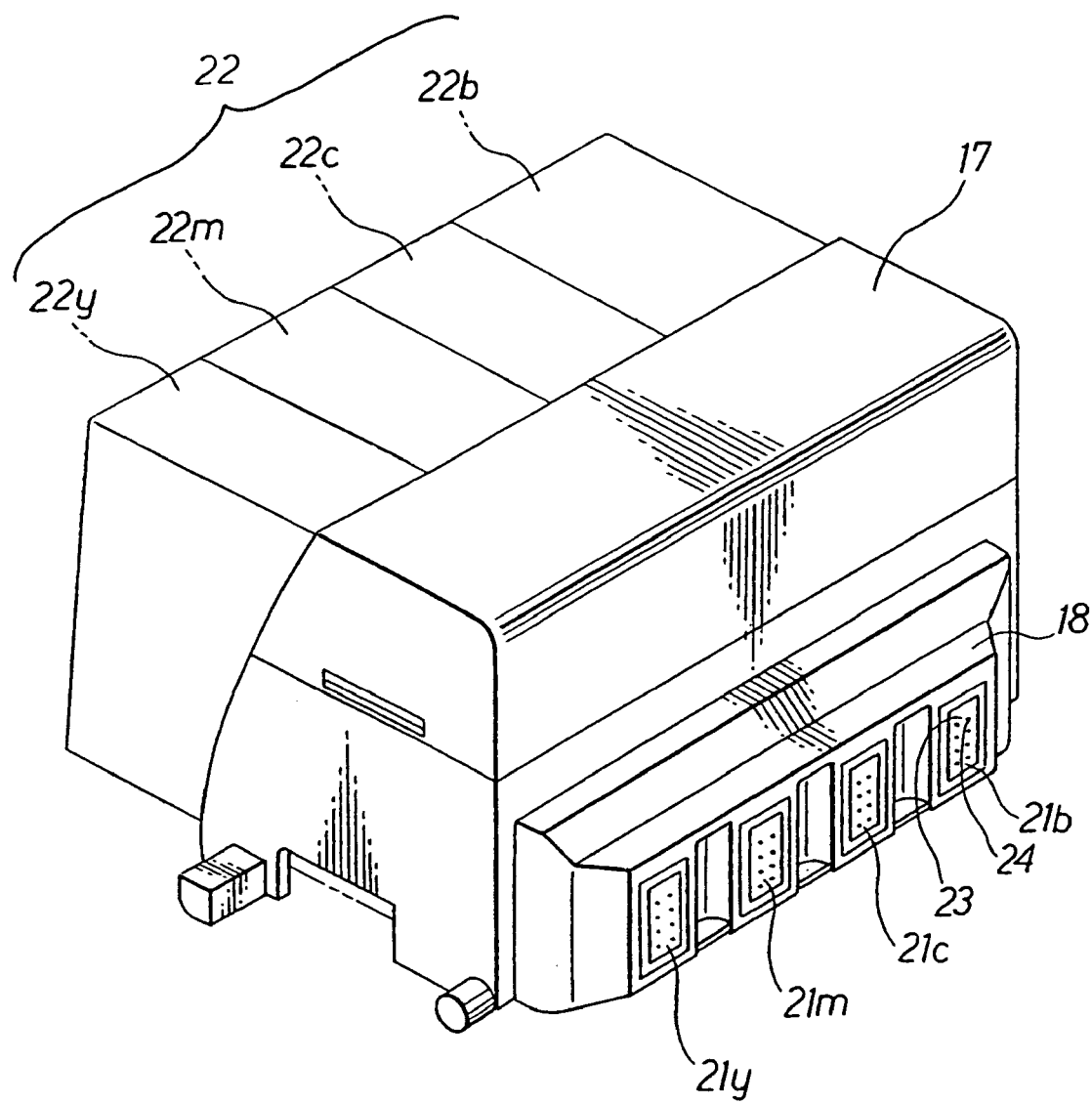
FIG. 7 shows an ink jet head which ejects four color inks and is provided with a color ink cartridge which contains the ink-jet recording ink in accordance with the invention.

An embodiment of an ink cartridge which contains the ink in accordance with the invention is shown in FIG. 7. The ink cartridge 22 has four compartments 22b, 22c, 22m, 22y which contain the black ink, cyan ink, magenta ink and yellow ink as prepared in the above examples, respectively. The compartment 22b, 22c, 22m, 22y may be formed integrally or independently. The ink cartridge 22 is removably installed on an ink jet head 18. The ink jet head 18 has nozzle heads 21b, 21c, 21m, 21y which communicate with the compartment 22b, 22c, 22m, 22y to eject the black ink, cyan ink, magenta ink and yellow ink, respectively. A plurality of nozzles 24 are formed on the surface 23 of each nozzle head. The ink jet head is typically mounted on a carriage 17 which moves on and along a surface of a recording sheet. The ink cartridge may be placed independent from the ink jet head. For example, the ink cartridge may be provided on the ink jet printer frame and be connected with the ink jet head by a flexible tube through which the ink is passed.

According to the present invention, it is possible to provide the ink for ink-jet recording which makes it possible to obtain vivid recorded matters by satisfying both of the prevention of the feathering and the prevention of the bleeding even when the recording is performed on regular paper.

What is claimed is:

1. An ink for ink-jet recording comprising:
    an anionic self-dispersing coloring agent;
    a surfactant having both of a cationic moiety and a nonionic moiety; and
    water;
    wherein a curve, which represents a change of surface tension of the ink with respect to a concentration of the surfactant, has one inflection point, the curve has a first local maximum point and a second local maximum point on a low concentration side and on a high concentration side of the inflection point respectively, and a concentration of the surfactant contained in the ink is higher than a concentration corresponding to the first local maximum point, and
    wherein the surfactant is an alkylamine ethylene oxide adduct represented by the following general formula (1):

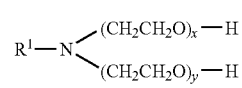

Formula (1)

wherein $R^1$ represents alkyl group having a number of carbon atoms of 8 to 18, and x and y represent integers which satisfy $x+y=5$ to 15.

2. The ink for ink-jet recording according to claim 1, wherein x and y represent integers which satisfy $x+y=5$, and an alkylamine ethylene oxide adduct represented by the formula (1) is contained by not less than 0.25% by weight.

3. The ink for ink-jet recording according to claim 1, wherein x and y represent integers which satisfy $x+y=15$, and an alkylamine ethylene oxide adduct represented by the formula (1) is contained by not less than 0.15% by weight.

4. An ink cartridge which accommodates the ink for ink-jet recording as defined in claim 1.

5. An ink for ink-jet recording comprising:
    an anionic self-dispersing coloring agent;
    a surfactant having both of a cationic moiety and a nonionic moiety; and
    water;
    wherein the surfactant is an alkylamine ethylene oxide adduct represented by the following general formula (1):

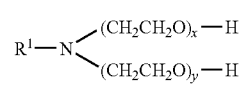

Formula (1)

wherein $R^1$ represents alkyl group having a number of carbon atoms of 8 to 18, and x and y represent integers which satisfy $x+y=5$ to 15.

6. The ink for ink-jet recording according to claim 5, wherein x and y represent integers which satisfy $x+y=5$, and an alkylamine ethylene oxide adduct represented by the formula (1) is contained by not less than 0.25% by weight.

7. The ink for ink-jet recording according to claim 5, wherein x and y represent integers which satisfy $x+y=15$, and an alkylamine ethylene oxide adduct-represented by the formula (1) is contained by not less than 0.15% by weight.

8. An ink cartridge which accommodates the ink for ink-jet recording as defined in claim 5.

* * * * *